United States Patent Office 3,482,435
Patented Dec. 9, 1969

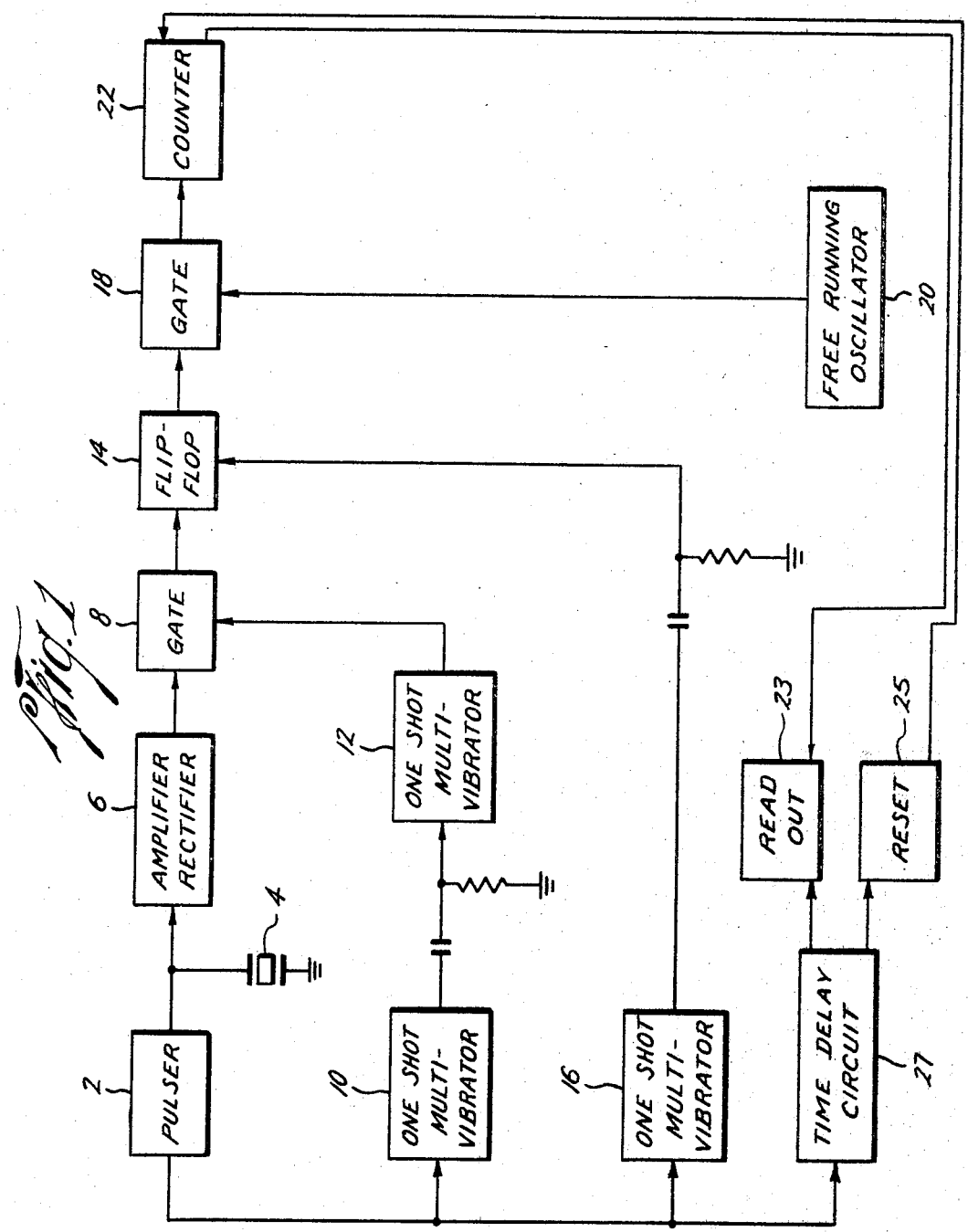

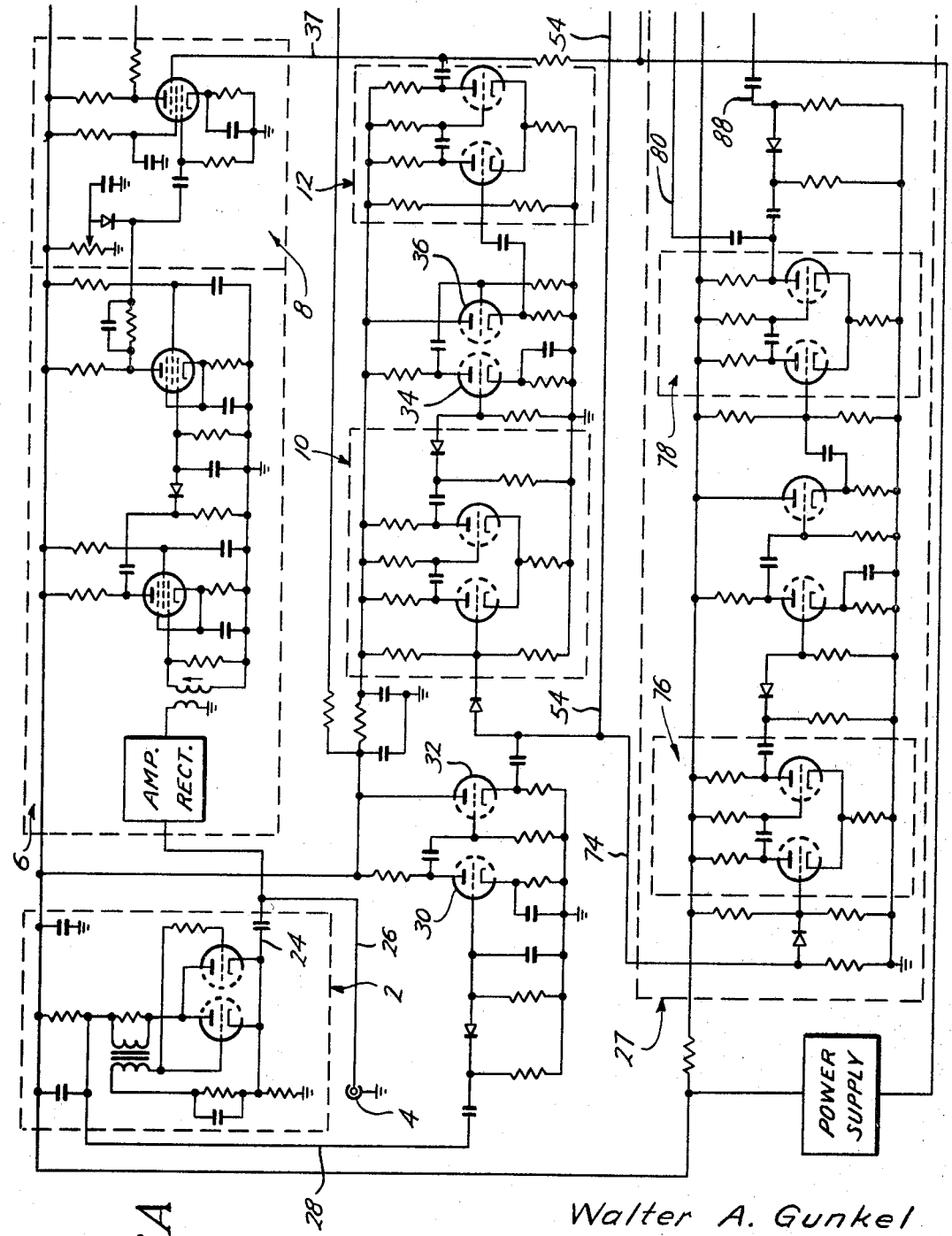

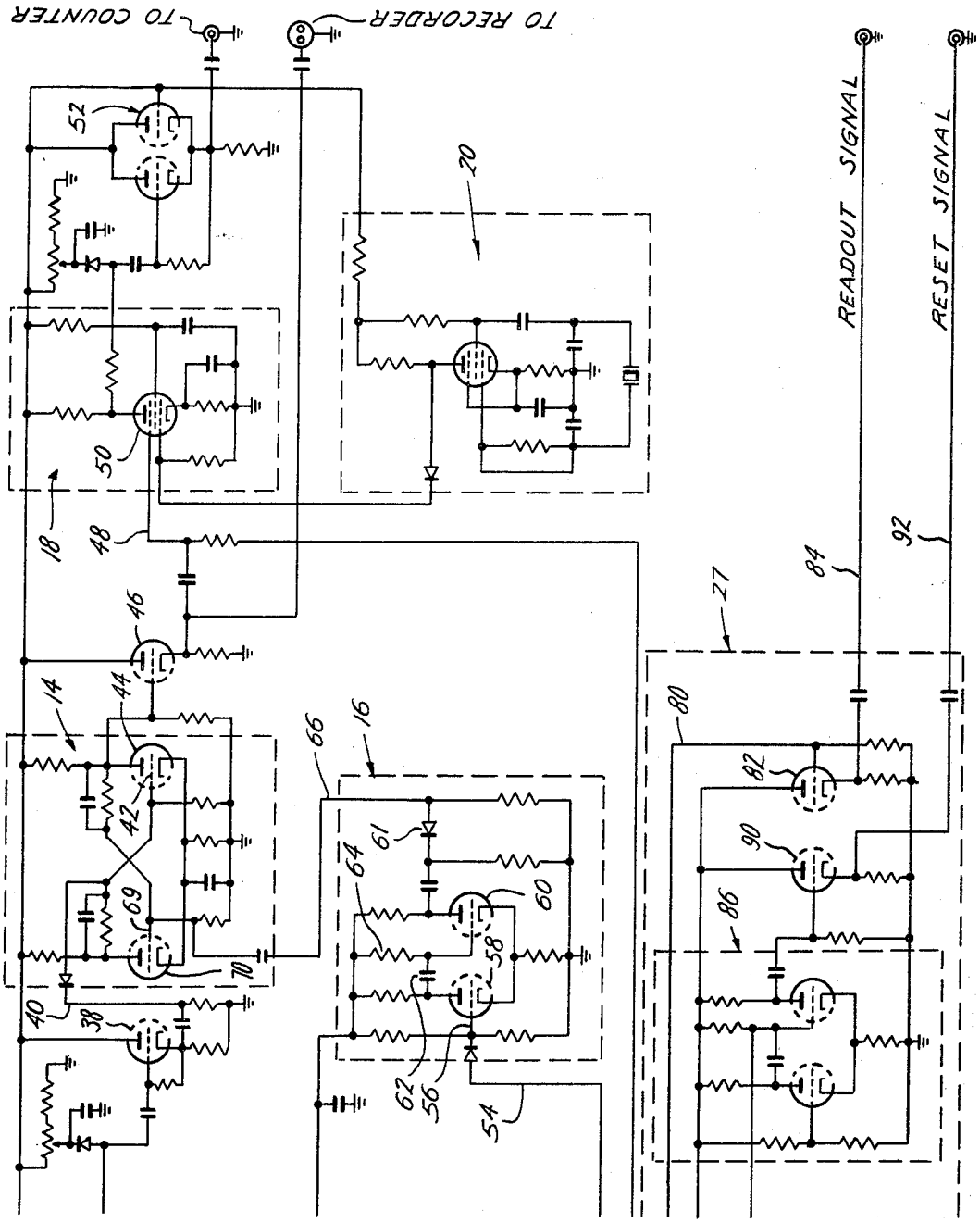

3,482,435
ULTRASONIC INSPECTION APPARATUS
Walter A. Gunkel, San Antonio, Tex., assignor to Southwest Research Institute, San Antonio, Tex., a trust estate of Texas
Filed Sept. 26, 1966, Ser. No. 586,592
Int. Cl. G01n 9/24
U.S. Cl. 73—67.9          3 Claims

ABSTRACT OF THE DISCLOSURE

The inspection apparatus transmits an ultrasonic signal into an article being inspected at an angle to the surface of the article so that the portion of the ultrasonic signal reflected by the surface will not be received by the transducer producing the signal. The only signal received by the transducer will be one reflected from a defect in the article being inspected. This signal opens a gate and connects a free running oscillator to a counter, which then begins to count the oscillations of the oscillator. After a fixed period of time from the initiation of the original signal, the gate will close stopping the counter. The number of cycles counted will indicate the location of the defect relative to the surface of the article being inspected. If no defect is encountered by the ultrasonic signal then the counter will not be initiated.

---

This invention relates to ultrasonic inspection apparatus wherein at least one aspect of the resulting intelligence is in digital form. That is, at least one parameter of such intelligence is measured by the number of pulses generated by the apparatus.

In the art of ultrasonic inspection, one technique involves the application of periodic pulses of ultrasonic frequencies to the article to be inspected by means of a suitable transducer which can be coupled to the article by a column of fluid. These pulses are then reflected from the surface of the article and from any acoustic discontinuities such as flaws or defects which may be present in the article and are detected by the original transducer or by other suitable means. By measuring the time of occurrence of such reflected pulses, it is possible to obtain information concerning the thickness of the article and the presence and location of any flaws or defects which may exist within the article. Systems based upon this type of measurement have found widespread application in industry and obviously, the precision of such measurements is directly related to the accuracy of the timing measurements.

In systems of this type, it is customary to display the "defect" signals on an oscilloscope having a time base which is usually triggered by the pulse which energizes the transducer. The operator determines the length of the elapsed time, and hence the location of the defect by measuring the position of the defect signal on the scope screen. Clearly, such systems rely heavily upon the judgment and accuracy of the operator. This disadvantage is accentuated as the speed of the inspection increases because it decreases the time in which the operator has to match the defect signal with the scale on the scope screen.

This disadvantage of prior art systems is overcome with the present invention, and novel time-measuring means are provided which eliminate reliance upon the accuracy and judgment of the operator as to the position of a defect signal on the scope screen while providing highly accurate time measurements which can be displayed on suitable counters or the like and which may, if desired, be supplied to card-punching apparatus, digital recording mechanisms or other suitable recording means.

The advantages of the present invention are preferably attained by providing a free-running oscillator with a bi-stable multivibrator or "flip-flop" circuit for gating the oscillator into or out of the display circuit. The flip-flop circuit may be turned "on" by a desired information signal and be turned "off" by a timing signal after a predetermined interval, or vice versa. Since the oscillator of the present invention preferably is continuously operating, its output frequency will be stable and will not be affected by the gating operation. Thus, the time of occurrence of the desired signal may be determined with a maximum error of one-half cycle of the oscillator frequency.

Accordingly, it is an object of the present invention to provide an ultrasonic inspection system having an improved timing circuit, which does not depend on an oscilloscope display for a readout.

Another object of the present invention is to provide an ultrasonic inspection system having a timing circuit which is compatible with card-punching apparatus and other digital readout means.

An additional object of the present invention is to provide an ultrasonic inspection system having a timing circuit using a gated oscillator to provide the digital coding for defect or other acoustic discontinuity location which avoids errors resulting from starting and stopping of the oscillator and reliance upon the accuracy and judgment of the operator in interpreting a visual oscilloscope display.

These and other objects and features of the present invention will be apparent from the following detailed description taken with reference to the figures of the accompanying drawings.

In the drawings:
FIG. 1 is a block diagram illustrating the present invention and showing an ultrasonic inspection system embodying a preferred timing circuit; and
FIGS. 2A and 2B together illustrate a circuit diagram of the apparatus of FIG. 1.

In the form of the invention chosen for purposes of illustration in the drawings, FIG. 1 shows an ultrasonic inspection system embodying a preferred timing circuit. With this arrangement, a pulser 2 applies electrical pulses to energize or ring a transducer 4 which converts these electrical pulses to acoustic pulses which are applied to the article to be inspected. The acoustic pulses are introduced into the article to be inspected at an angle less than 90° so the portion of the acoustic signal reflected from the surface of the article will not be received by the transducer. Acoustic pulses are also reflected from defects in the article. These reflected signals are received by the transducer 4 and reconverted into electrical signals which are passed through suitable amplifier and rectifier circuits, indicated by block 6, and are applied to a normally closed gate 8. The pulse from pulser 2 is also supplied to two one-shot multivibrators 10 and 12 which serve as a time-delay circuit and act to open gate 8 after the pulse from pulser 2 has passed and to reclose gate 8 before the emission of a subsequent pulse from pulser 2. Since the pulses from pulser 2 have magnitudes which may be as much as 1000 times the magnitudes of the subsequent signals of the echo train, which carry the desired intelligence, the apparatus described serves to prevent these large pulses from overloading and possibly paralyzing the circuitry during the time domain of the echo train.

After being passed by gate 8, the signals of the echo train are passed to a bi-stable multivibrator or flip-flop circuit 14 which also receives a timing signal from a one-shot multivibrator 16. The flip-flop circuit 14 controls the opening and closing of a second normally closed gate 18; and to perform the desired timing operation, a free-running oscillator 20 is provided and is connected to supply its output through gate 18 to suitable counters 22 or other appropriate readout means. As indicated, gate 18 is controlled by the flip-flop circuit 14 which is arranged to "open" gate 18, in response to receipt of a defect signal to pass the output of oscillator 20 to the counters 22 and to "close" gate 18, in response to the timing signal provided by multivibrator 16, to prevent passage of further cycles from oscillator 20 to the counters 22. Since oscillator 20 is free-running, its output will be stable and will not be affected by actuation of gate 18. Thus, the maximum error which can occur with the timing circuit of the present invention is one-half cycle of the frequency of oscillator 20.

During the time interval when gate 18 is open, the counters 22 will count the number of cycles of oscillator 20 passed by gate 18. After gate 18 closes, the total count accumulated by the counters 22 may be supplied to suitable card-punching apparatus or other digital readout means, indicated generally by block 23. In addition, the counters 22 must be reset to zero in preparation for a subsequent timing operation. The reset mechanism may be conventional and is indicated by block 25. To accomplish these operations, the pulse from pulser 2 which triggers one-shot multivibrator 16 also passes through a suitable time-delay circuit, indicated by block 27 and after a predetermined time interval, which is longer than the time delay provided by one-shot multivibrator 16 but shorter than the time between successive pulses from the pulser 2, the time-delay circuit 27 supplies suitable signals to actuate the read-out mechanism 23 and reset mechanism 25.

FIGS. 2A and 2B show a more detailed diagram of the circuit of FIG. 1 in which the portions of the circuit corresponding to the blocks of FIG. 1 are enclosed by dashed lines and are indicated generally by the reference numerals employed in the description of FIG. 1. As shown, pulser 2 comprises a free running blocking oscillator which supplies electronic pulses to the transducer 4 over conductors 24 and 26. These pulses also pass through the amplifier and rectifier circuits, indicated at 6, but are blocked by the normally closed gate 8. Simultaneously, a pulse from pulser 2 is applied through conductor 28, amplifier 30 and cathode follower 32 to trigger one-shot multivibrator 10. After a time-delay determined by its circuit components, multivibrator 10 sends a pulse through amplifier 34 and cathode follower 36 to trigger one-shot multivibrator 12. When multivibrator 12 is so triggered, the resulting positive signal is applied via conductor 37 to gate 8 to open the same. The time delay afforded by multivibrator 10 should be sufficiently long to permit gate 8 to remain closed until the initial or time zero pulse has been dissipated but short enough that gate 8 will be opened before the reflected intelligence signals arrive at the gate. The time period of multivibrator 12 is long enough to permit the desired echo signals, if any, to pass but is short enough to close the gate before the pulser emits its next pulse to thereby gate in the intelligence signals and gate out the initial pulse signals.

Upon receipt of acoustic signals reflected from the article under inspection, transducer 4 converts these signals to electrical signals and supplies them by way of conductor 24 and the rectifier and amplifier circuits of block 6, to the gate 8. Since gate 8 has now been opened by the signal from multivibrator 12, the intelligence signals of the echo train are passed through a base-clipping cathode follower 38 and conductor 40 to the control grid 42 of triode 44 of the flip-flop circuit 14. This causes the normally "on" triode 44 to extinguish and send a positive gating signal through cathode follower 46 and conductor 48 to allow the normally extinguished pentode 50 of gate 18 to conduct. In response to this signal, pentode 50 of gate 18 passes to cyclic output from free-running oscillator 20, which is applied through the control grid of pentode 50, to cathode follower 52 to actuate the counters, indicated by block 22. The counters 22 may be conventional and, therefore, are not shown in detail.

The pulse from pulser 2, which is applied through cathode follower 32 to trigger one-shot multivibrator 10, is also applied via conductor 54 to control grid 56 of normally non-conductive triode 58 of one-shot multivibrator 16. This signal extinguishes triode 60 and causes triode 58 to conduct for a time interval determined by the values of capacitor 62 and resistor 64. When triode 60 of multivibrator 16 is extinguished, the resulting positive going signal is blocked by rectifier 61. However, when the circuit times out and triode 60 fires, the resulting negative going signal is differentiated and applied via conductor 66 to the control grid 69 of triode 70 of the flip-flop circuit 14 to turn triode 70 off and triode 44 on. This reversal of the flip-flop closes gate 18 thereby halting the passage of the output of oscillator 20 to the counters 22.

It will thus be seen that gate 8 and its associated timing circuits are designed to gate out the initial or transducer ringing pulses and to pass the reflected intelligence pulse or pulses. Since this circuit is designed to be employed in shear wave techniques, the transducer beam will enter the object to be tested at an angle of less than ninety degrees and therefore, there will be no top surface echo. The reflected intelligence signals will accordingly be "defect" signals. It is this signal which reverses the flip-flop and opens gate 18 to start the counting of the oscillators. Since gate 18 is closed a fixed time after the initial or transducer ringing pulse, the number of oscillations passed will be a function of the location of the defect. For example, a low count would indicate the defect to be farther away from the transducer than it would be when a high count is realized.

It should be noted that, although the cyclic output for the counters 22 is supplied by oscillator 20 through gate 18, oscillator 20 is not effected by the condition of gate 18. Thus, oscillator 20 operates continuously and is able to provide a stable signal immediately upon opening of gate 18 and will not supply any overrunning oscillations to the counters 22 after gate 18 is closed. Consequently, the timing provided by the circuit of the present invention will have a maximum error of one-half cycle of the frequency of oscillator 20. Accordingly, measurements made with the ultrasonic inspection system disclosed will be highly precise and reliable.

As described above, the counters 22 will count the number of cycles passed by oscillator 20 during the time interval when gate 18 is open. After gate 18 closes, the total count accumulated by the counters 22 may be supplied to suitable card-punching apparatus or other digital readout which may be conventional and is indicated by block 23. In addition, the counters 22 must be reset to zero by suitable reset mechanism, indicated by block 25, in preparation for a subsequent timing operation. To accomplish this, the pulse from pulser 2 which is passed through cathode follower 32 to start the time delays provided by multivibrators 10 and 16 may also be applied through conductor 74 to trigger one-shot multivibrator 76 of time-delay circuit 27. After a suitable time delay, multivibrator 76 sends a pulse to trigger multivibrator 78 which, after a further time delay, sends a pulse via conductor 80, cathode follower 82 and conductor 84 to trigger the readout mechanism 23. At the same time, multivibrator 78 triggers multivibrator 86 through conductor 88. After a time delay sufficient to permit actuation of the readout mechanism 23, multivibrator 86 passes a pulse through cathode follower 90 and conductor 92 to actuate the reset mechanism 25. The reset mechanism 25 then resets counters 22 to zero in preparation for a subsequent timing operation.

From the foregoing, it will be seen that this invention is one well adapted to attain all of the ends and objects hereinabove set forth, together with other advantages which are obvious and which are inherent to the apparatus and structure.

The invention having been described, what is claimed is:

1. An ultrasonic inspection system for locating defects in articles such as pipe and the like comprising, means for emitting an electrical pulse, transducer means for converting the electrical pulse into an ultrasonic signal for transmittal into the article being inspected and for converting ultrasonic signals reflected from the article into electrical signals, said ultrasonic signal being transmitted into the article at an angle of less than ninety degrees to its surface to avoid receipt by the transducer means of the portion of the signal reflected by the surface of the article being inspected, a free running signal generator continuously emitting a cyclic output at a fixed frequency, counter means for counting the cycles of said output, gate means for regulating passage of said output to said counter means, a bi-stable multivibrator for controlling said gate means, means for passing to said bi-stable multivibrator the electrical signal produced by the transducer means by the reflection of a portion of the ultrasonic signal by a defect in the article to cause said multivibrator to allow said gate means to pass said oscillator output to said counter means, and means responsive to said pulsing means for causing said multivibrator to condition said gate means to block passage of said oscillator output to said counter means upon lapse of a predetermined time interval after the pulsing means has emitted an electrical pulse so that the location of the defect is determined by the number of cycles counted.

2. The ultrasonic inspection system of claim 1 wherein said means for causing said multivibrator to condition the gate means includes a one-shot multivibrator responsive to said electrical pulse for causing said bi-stable multivibrator to condition said gate means to block passage of said oscillator output to said counter means after a predetermined time interval.

3. An ultrasonic inspection system for locating defects in articles such as pipe and the like comprising, means for emitting an electrical pulse, transducer means for converting the electrical pulse into an ultrasonic signal for transmittal into the article being inspected and for converting ultrasonic signals reflected from the article into electrical signals, said ultrasonic signal being transmitted into the article at an angle of less than ninety degrees to its surface to avoid receipt by the transducer means of the portion of the signal reflected by the surface of the article being inspected, a free running signal generating means for continuously emitting a cyclic output at a fixed frequency; means for counting the cycles of the output, first gate means for regulating the passage of said cyclic output to said display means, a bi-stable multivibrator connected to the first gate means so that when the bi-stable multivibrator is in a first of its states it opens the first gate and when in its second state it closes the first gate, means including a second gate connecting the pulsing and transducer means to said bi-stable multivibrator so that when a reflected ultrasonic signal from a defect produces an electrical signal from the transducer the connecting means conducts said signal to the bi-stable multivibrator, and the latter is switched to its first state to open the first gate, first timing means having a timing interval initiated by one of said electrical pulses and terminating a predetermined time thereafter and connected to said second gate to open same during said interval, said first timing means including time delay means to delay arrival of said electrical pulses to initiate said interval until after such electrical pulse has been applied to the closed second gate, and second timing means having a time interval initiated by one of said electrical pulses and connected to emit a signal at the end of its timing interval to cause the bi-stable multivibrator to revert to its second state to close the first gate and interrupt passage of said cyclic output to the display means whereby the number of cycles counted indicates the location of the defect that reflected the ultrasonic signal.

References Cited

UNITED STATES PATENTS

| 2,562,449 | 7/1951 | De Lano | 73—67.9 |
| 3,354,700 | 11/1967 | Schindler | 73—67.9 |
| 3,372,576 | 3/1968 | Dory | 73—67.9 |

FOREIGN PATENTS

| 1,368,133 | 6/1964 | France. |

RICHARD C. QUEISSER, Primary Examiner

J. P. BEAUCHAMP, Assistant Examiner